«12» United States Patent
Chen et al.

(10) Patent No.: US 7,677,747 B2
(45) Date of Patent: Mar. 16, 2010

(54) COMPUTER PANEL WITH LIGHT-REFLECTING AND LIGHT-SHIELDING MEMBER

(75) Inventors: Yun-Lung Chen, Taipei Hsien (TW); Qing-Hao Wu, Shenzhen (CN)

(73) Assignees: Hong Fun Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 187 days.

(21) Appl. No.: 11/833,245

(22) Filed: Aug. 3, 2007

(65) Prior Publication Data

US 2008/0239699 A1 Oct. 2, 2008

(30) Foreign Application Priority Data

Apr. 2, 2007 (CN) .................... 2007 2 0200215 U

(51) Int. Cl.
*F21V 33/00* (2006.01)
(52) U.S. Cl. .................. 362/85; 362/282; 362/362; 362/367; 362/154
(58) Field of Classification Search ............. 362/85, 362/282, 322, 362, 367, 371, 800, 154, 296
See application file for complete search history.

(56) References Cited

U.S. PATENT DOCUMENTS 4,868,720 A * 9/1989 Miyauchi et al. ............ 362/466

* cited by examiner

*Primary Examiner*—Jacob Y Choi
(74) *Attorney, Agent, or Firm*—Frank R. Niranjan

(57) ABSTRACT

A panel assembly includes a panel (10), a mounting apparatus (50), a light-reflecting member (30) and a rotary member (70). The panel includes a light-pervious area (131) and an opaque area. The mounting apparatus is mounted in an inside of the panel. The light-reflecting member is pivotably coupled to the mounting apparatus. The light-reflecting member has an engaging member (371) and a light-pervious portion (35) for emitting light. The rotary member is rotatably attached to the mounting apparatus and accessible from an outside of the panel, and the rotary member being meshed with the engaging member of the light-reflecting member for driving the light-reflecting member to rotate between a first position where the light-pervious portion is aligned with the light-pervious area and a second position where the light-pervious portion faces toward the opaque area of the panel.

15 Claims, 8 Drawing Sheets

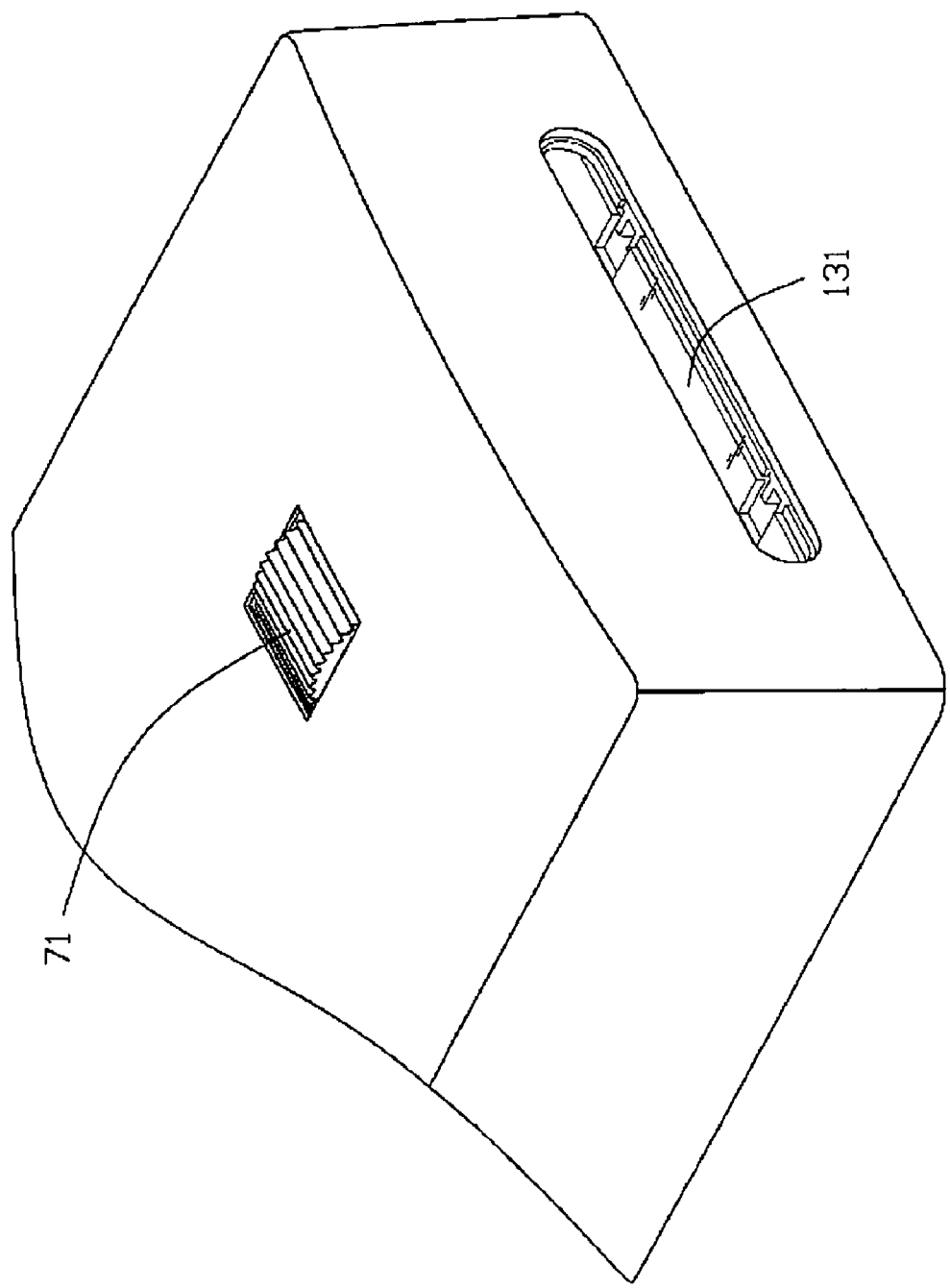

COMPUTER PANEL WITH LIGHT-REFLECTING AND LIGHT-SHIELDING MEMBER

BACKGROUND

1. Field of the Invention

The present invention relates to front panels of computer systems, and more particularly to a front panel of a computer system with a light-reflecting and light-shielding member.

2. Description of Related Art

Usually, a light source, such as a light-emitting diode, is installed on a front panel of a computer system, in order to indicate the working state of the computer system. Generally, a light-pervious switch button is positioned on the front panel. When the switch button is pushed to press an electrical switch, the power supply switches on and the light source emits light, and the switch button is illuminated. However, in conventional computer systems, one light source corresponds to only one switch button. If another switch button or light-pervious member needs illumination, additional light-emitting diodes should be provided. In addition, the light-emitting diode as a spot light source, lights only a limited area.

Another conventional apparatus is provided for illuminating light-pervious members and enlarging the lit area of the light source, which includes a light-reflecting member mounted on a computer panel. The light-reflecting member includes a light incident surface, a light-guiding portion, and a light-showing portion. A bracket is disposed above the light incident surface for receiving a light source. Rays emitted by the light source are reflected by the light-guiding portion, and illuminate a larger area of the computer panel via the light-showing portion. However, the light of the computer panel cannot be shielded when users don't want to see the light while the computer is running.

What is needed, therefore, is a front panel of a computer system with a light-reflecting and light-shielding member allowing a larger area of the computer panel to be lit and also shield the light when so desired.

SUMMARY

A panel assembly includes a panel, a mounting apparatus, a light-reflecting member and a rotary member. The panel includes a light-pervious area and an opaque area. The mounting apparatus is mounted in an inside of the panel. The light-reflecting member is pivotably coupled to the mounting apparatus. The light-reflecting member has an engaging member and a light-pervious portion for emitting light. The rotary member is rotatably attached to the mounting apparatus and accessible from an outside of the panel, and the rotary member being meshed with the engaging member of the light-reflecting member for driving the light-reflecting member to rotate between a first position where the light-pervious portion is aligned with the light-pervious area and a second position where the light-pervious portion faces toward the opaque area of the panel.

Other advantages and novel features of the present invention will become more apparent from the following detailed description of a preferred embodiment when taken in conjunction with the accompanying drawings, in which:

BRIEF DESCRIPTION OF THE DRAWINGS

FIG. 8 is similar to FIG. 8, but viewed from another aspect.

DETAILED DESCRIPTION OF THE EMBODIMENT

Figure 1:
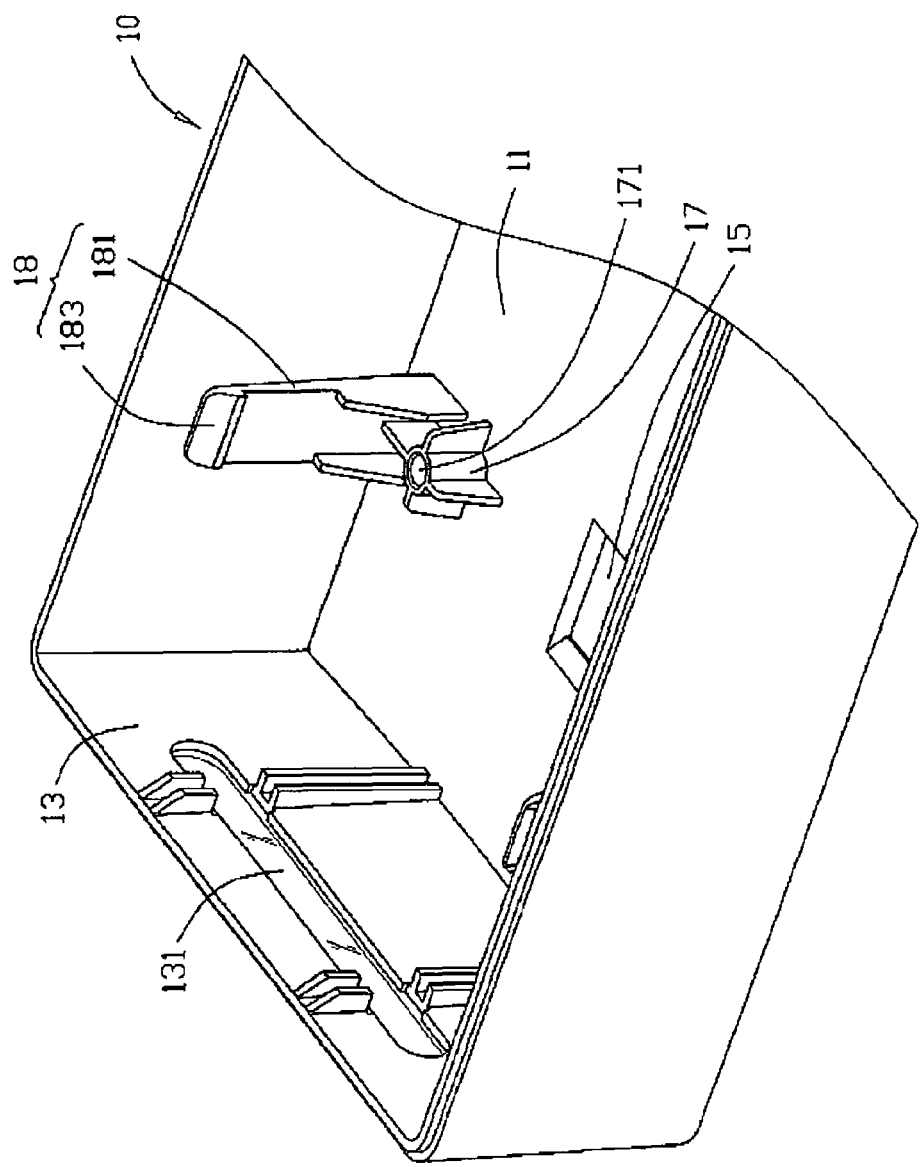
FIG. 1 is an enlarged isometric partial view of a panel in accordance with a preferred embodiment of the present invention.
Figure 2:
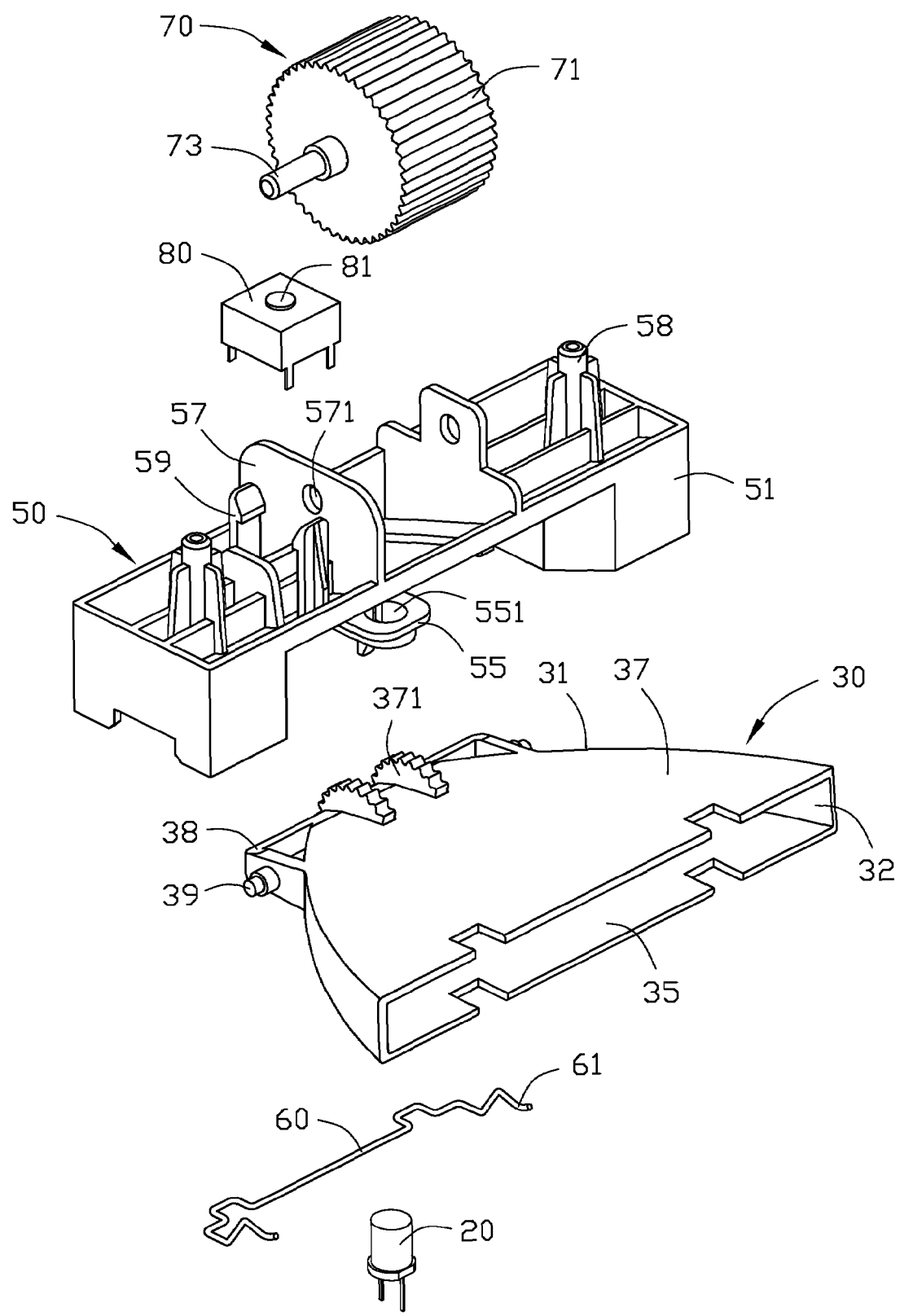
FIG. 2 is an exploded, isometric view of a light-reflecting and light-shielding apparatus and mounting apparatus in accordance with the preferred embodiment of the present invention.

Referring to FIGS. 1 and 2, a light-reflecting and light-shielding member of a preferred embodiment of the present invention includes a computer panel 10, a light-reflecting member 30, a mounting apparatus 50, and a rotary member 70.

The computer panel 10 includes a base 11 and a bent plate 13 generally perpendicular to the base 11. A receiving area 15 is defined in the inner surface of the base 11. Two positioning posts 17 are respectively formed at opposite sides of the receiving area 15. Each positioning post 17 defines a positioning hole 171 therein. A pair of resilient hooks 18 protrudes from the base 11 outside the positioning posts 17. Each resilient hook 18 includes a supporting portion 181 and a clasp 183 protruding from a free end of the supporting portion 181. A light-pervious area 131 is formed in the center of the bent plate 13.

Figure 3:
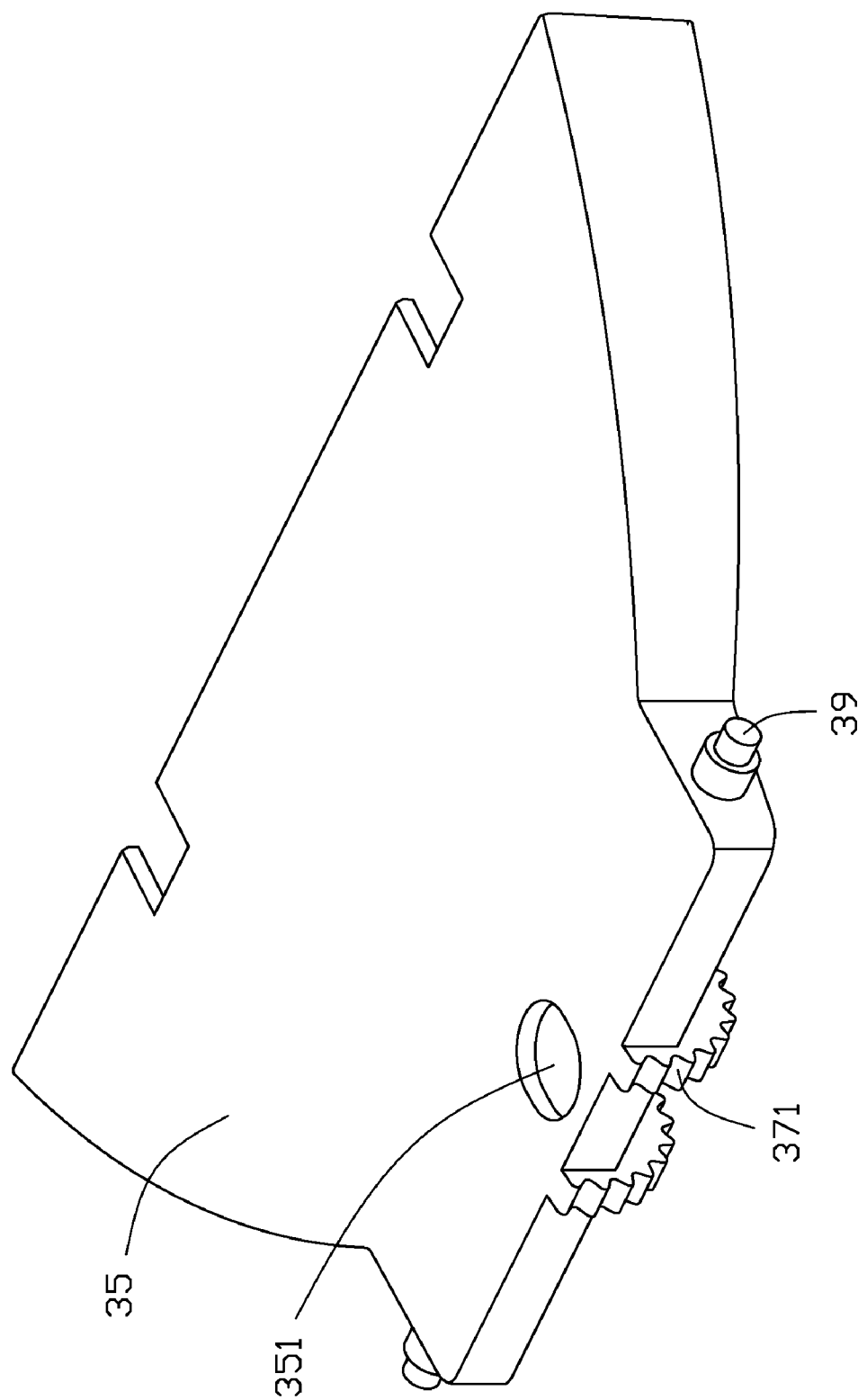
FIG. 3 is an enlarged isometric view of the light-reflecting member of FIG. 2, but viewed from another aspect.

Referring also to FIG. 3, the light-reflecting member 30 is configured to be disposed on an inner surface of the computer panel 10, for reflecting light and illuminating a large area. The light-reflecting member 30 has a hollow body 31 including a semicircular top wall 35 and a semicircular bottom wall 37 parallel to the top wall 35. A rectangular light-pervious portion 32 is defined at one side of the body 31 corresponding to the light-pervious area 131 on the panel 10. An accommodating hole 351 is defined in the top wall 35 at another side opposite to the light-pervious portion 32 of the body 31. A pair of toothed engaging members 371 protrudes from the bottom wall 37 adjacent to the accommodating hole 351. A frame 38 protrudes from an arced portion of the body 31 away from the light-pervious portion 32, and a pair of pivots 39 protrudes from the opposite ends of the frame 38 respectively.

Figure 4:
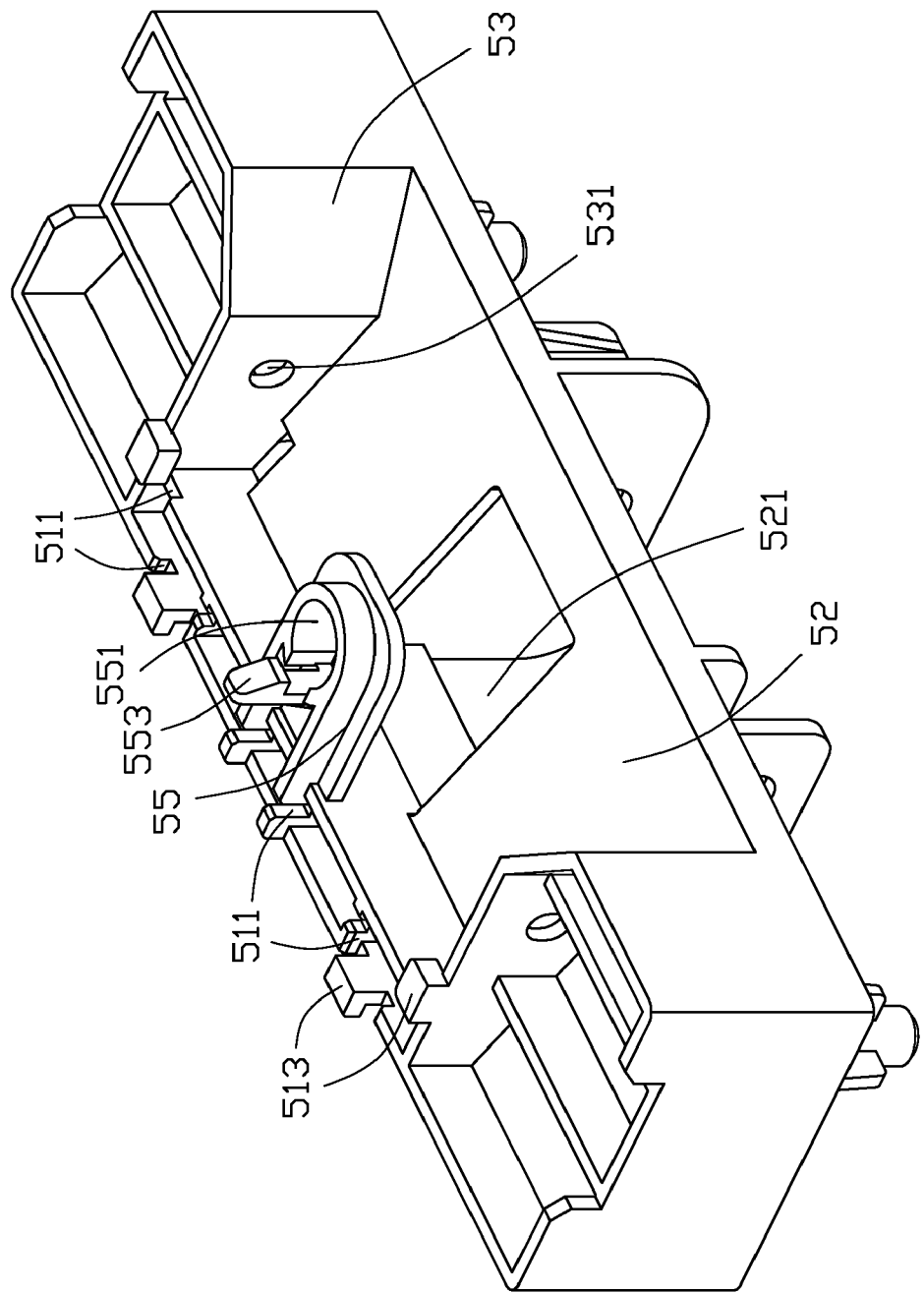
FIG. 4 is an enlarged isometric view of the mounting apparatus of FIG. 2, but viewed from another aspect.
Figure 5:
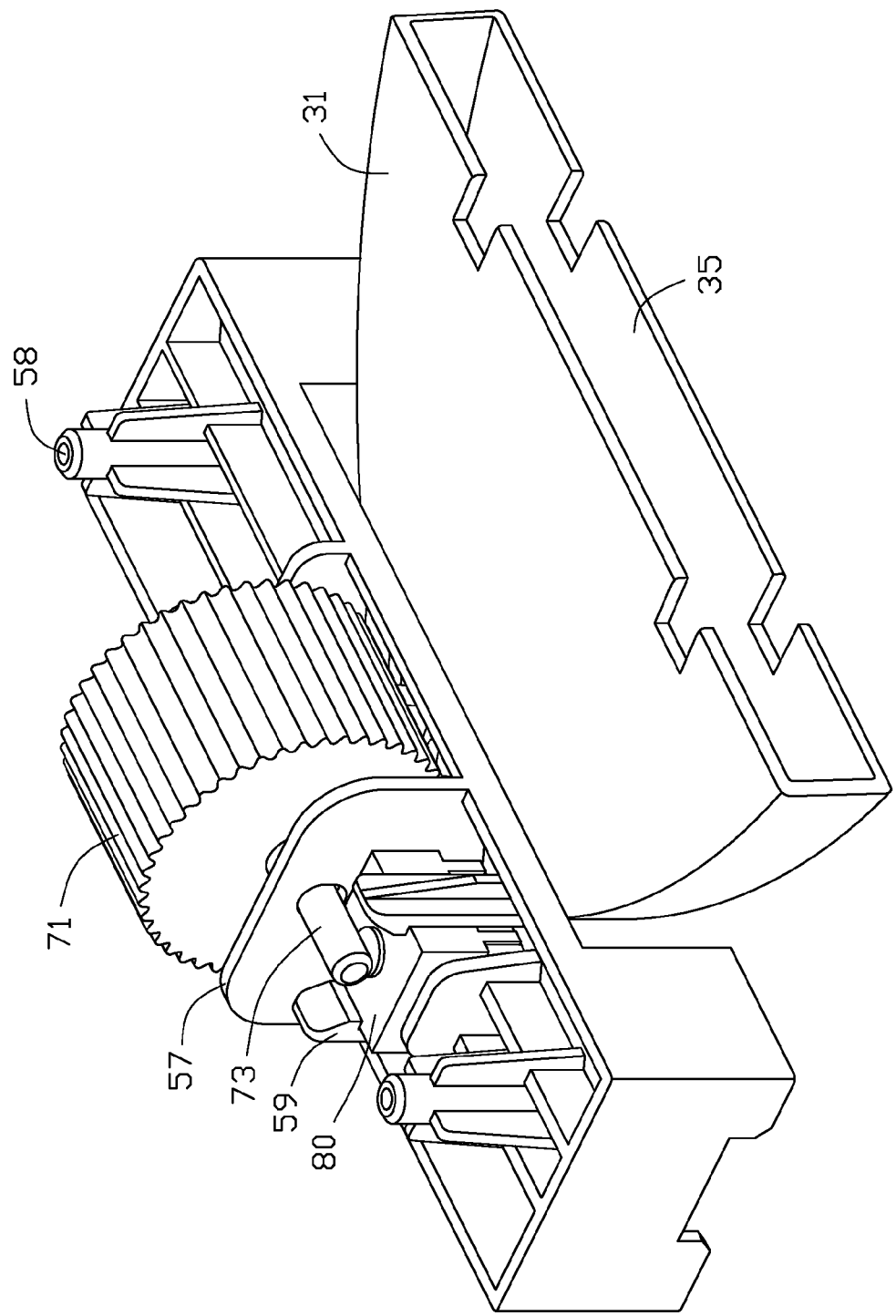
FIG. 5 is an assembled view of the light-reflecting member and the mounting apparatus of FIG. 2.
Figure 6:
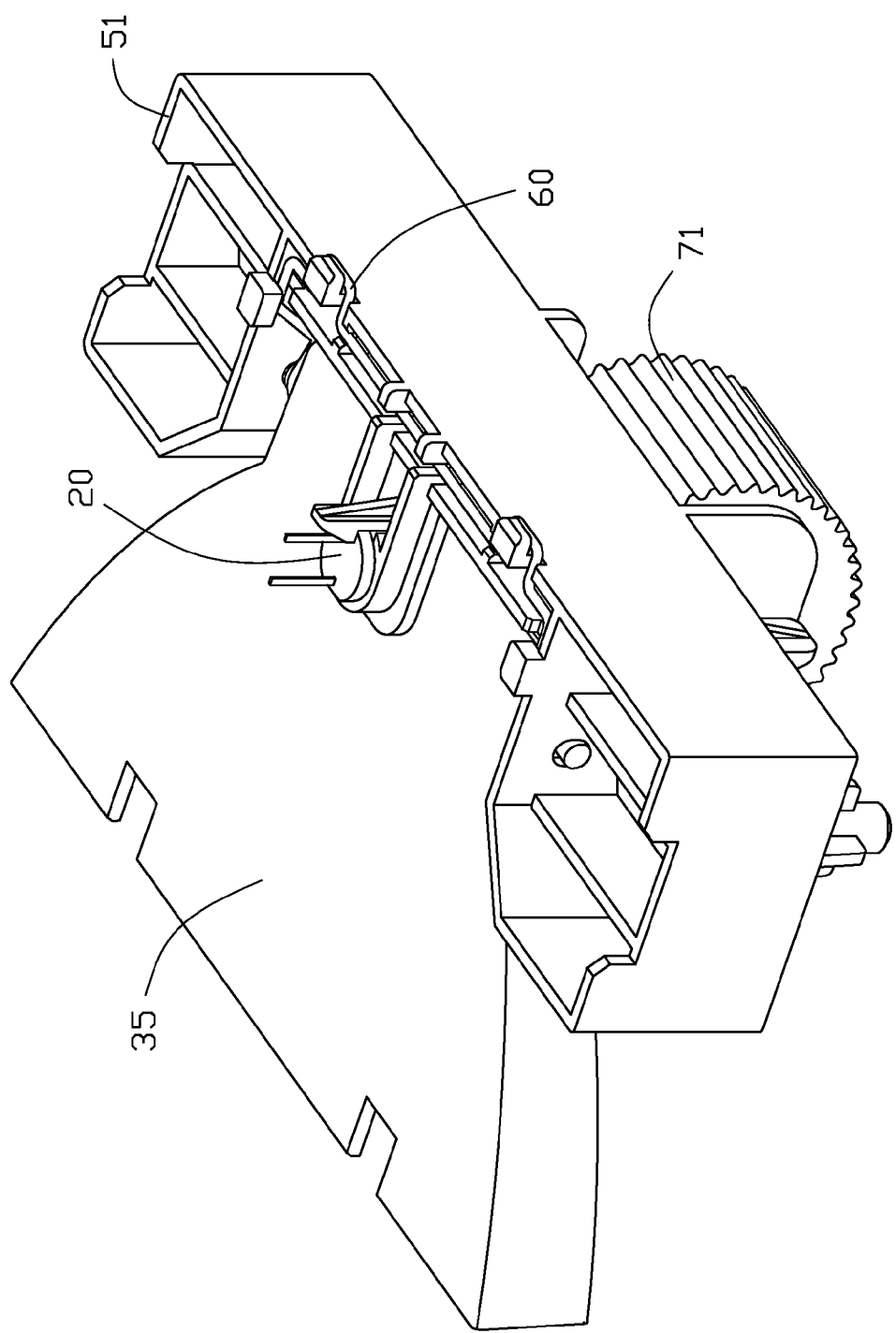
FIG. 6 is an assembled view of the light-reflecting member and the mounting apparatus of FIG. 2, but viewed from another aspect.
Figure 7:
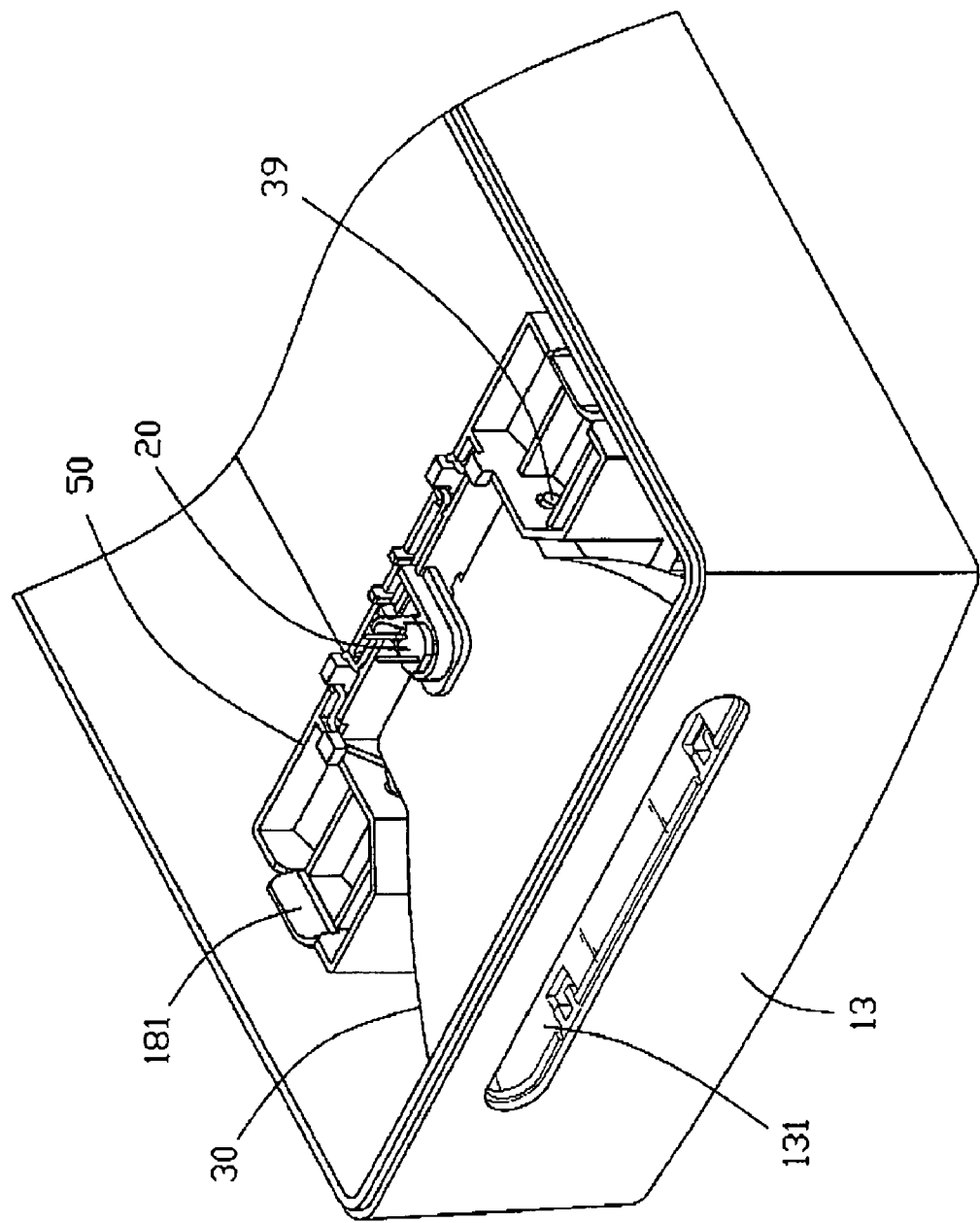
FIG. 7 is an assembled partial view of the panel with the light-reflecting and light-shielding apparatus.

Referring also to FIG. 4, the mounting apparatus 50 includes a main body 51 with a slanted recessed portion 52 formed in the center on one side, for receiving the light-reflecting member 30. An opening 521 is defined in the center of the recessed portion 52. A pair of sidewalls 53 extends from opposite sides of the recessed portion 52 respectively, and each sidewall 53 defines a pivot hole 531 for the pivots 39 of the light-reflecting member 30 pivoting and moving up and down therein. A receiving portion 55 with a receiving hole 551 extends from one edge of the main body 51, for receiving an indicator light 20. A hook 553 is formed on the receiving portion 55 adjacent to the receiving hole 55, for blocking the indicator light 20 from escaping from the receiving portion 55. A plurality of receiving slots 511 and stopper portions 513 are defined at the border around the recessed portion 52. A bent resilient member 60 is received in the receiving slots 511 and stopped in the recessed portion 52 by the stopper portions 513. The resilient member 60 includes two resilient free ends 61 formed at opposite ends, abutting on the sidewalls 53 of the main body 51. A pair of tabs 57 protrudes from the other side of the main body 51 opposite to the recessed portion 52. Each tab 57 defines a rotating hole 571, for an axle 73 of the rotary member 70 rotating and moving up and down therein. The rotary member 70 includes a cylindrical gear 71, and the axles 73 respectively extend from the center of opposite sides of the gear 71. A pair of fixing poles 58 protrudes from opposite ends of the main body 51 respectively, corresponding to the positioning holes 171 of the panel 10. A pair of resilient clasps 59 is formed between one of the pair of tabs 57 and the adjacent fixing pole 58, for receiving a switch element 80 having a resilient switch 81 therebetween.

Referring also to FIGS. 5 to 8, in assembly, the top portion of the light-reflecting member 30 is received between the recessed portion 52 and the receiving portion 55, and the pivots 39 of the light-reflecting member 30 are pivotably inserted into the corresponding pivot holes 531. The resilient member 60 is mounted on the mounting apparatus 50, and the resilient free ends 61 respectively extend into the recessed portion 52 of the mounting member 50, for resisting below the corresponding pivots 39 of the light-reflecting member 30. The indicator light 20 is fixed into the receiving portion 55 of the mounting apparatus 50, inserted into the accommodating hole 351 of the light-reflecting member 30 through the receiving hole 551 of the receiving portion 55, and blocked by the hook 553, for reflecting light to the light-pervious portion 32 of the light-reflecting member 30. The rotary member 70 is mounted between the two tabs 57 of the mounting apparatus 50, and the axles 73 are respectively inserted into the corresponding rotating holes 571 of the tabs 57. One of the axles 73 abuts on the resilient switch 81 of the switch element 80. The bottom of the gear 71 meshes with the two engaging members 371 of the light-reflecting member 30 through the opening 521 of the mounting apparatus 50. Initially, the pivots 39 of the light-reflecting member 30 abut on the top of the corresponding pivot holes 531 of the mounting apparatus 50 urged by a resilient action of the resilient member 60, and the axles 73 of the rotary member 70 also abut on the top of the corresponding rotating holes 571 of the mounting apparatus 50, thereby the light-reflecting member 30 and the rotary member 70 can stably revolve in the mounting apparatus 50. After the light-reflecting member 30 is fixed on the mounting apparatus 50, the mounting apparatus 50 is pushed toward the panel 10, until the fixing poles 58 of the mounting apparatus 50 are inserted into the corresponding positioning holes 171 of the panel 10. At this time, the clasps 183 of the resilient hooks 18 abut against the top edges of two sides of the mounting apparatus 50. The mounting apparatus 50 is thus secured in the panel 10. The gear 71 of the rotary member 70 extends through the receiving area 15 of the panel 10, thereby exposing it.

In use, if users want the light from the indicator light 20 to illuminate the light-pervious area 131, the gear 71 of the rotary member 70 is turned, meshing with the engaging member 371 of the light-reflecting member 30 to drive the light-reflecting member 30 to pivot into the pivot holes 531. When the light-pervious portion 32 is in alignment with the light-pervious area 131 of the panel 10, the light emitted by the indicator light 20 will transmit to the outside of the panel 10 through the light-pervious area 131. When the light-pervious portion 32 is not in alignment with the light-pervious area 131 of the panel, the light emitted by the indicator light 20 will be blocked by the bent plate 13 of the panel 10 and not transmitted to the outside of the panel 10.

In addition, the rotary member 70 can function as a power button. In use, the gear 71 is pressed from the outside of the panel 10, and one of the axles 73 of the rotary member 70 positioned on the switch element 80 presses the resilient switch 81 to turn on/off the computer. At this time, the gear 71 will engage with the engaging member 371 of the light-reflecting member 30 to drive the light-reflecting member 30 to move down. The resilient free ends 61 of the resilient member 60 are pushed by the pivots 39 of the light-reflecting member 30. When the rotary member 70 is released, the resilient free ends 61 of the resilient member 60 rebound to drive the light-reflecting member 30 up. Then the rotary member 70 returns to its original position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel assembly comprising:
   a panel having a light-pervious area and an opaque area;
   a mounting apparatus mounted in an inside of the panel;
   a light-reflecting member pivotably coupled to the mounting apparatus, the light-reflecting member having an engaging member and a light-pervious portion for emitting light; and
   a rotary member rotatably attached to the mounting apparatus and accessible from an outside of the panel, the rotary member being meshed with the engaging member of the light-reflecting member for driving the light-reflecting member to rotate between a first position where the light-pervious portion is aligned with the light-pervious area and a second position where the light-pervious portion faces toward the opaque area of the panel;
   wherein a switch element is received in the mounting apparatus, and the rotary member is, movable toward the switch element so as to actuate the switch element.

2. The panel assembly as described in claim 1, wherein a pair of tabs is formed on the mounting apparatus, a pair of axles protrudes from opposite sides of the rotary member, each tab defines a rotating hole for the corresponding axle rotating therein, and one of the pair of axles abuts on the switch element.

3. The panel assembly as described in claim 1, wherein the mounting apparatus comprises a recessed portion defining an opening for receiving a first side of the light-reflecting member, and the rotary member is meshed with the engaging member through the opening.

4. The panel assembly as described in claim 3, wherein the mounting apparatus has a receiving portion for receiving an indicator light therein, the first side of the light-reflecting member being received between the recessed portion and the receiving portion and defining an accommodating hole corresponding to the receiving portion for receiving the indicator light.

5. The panel assembly as described in claim 3, wherein a pair of pivot holes is defined in opposite sides of the recessed portion of the mounting apparatus, two pivots protrude from opposite ends of the light-reflecting member for pivoting in the corresponding pivot hole.

6. The panel assembly as described in claim 5, wherein a resilient member having two resilient free ends extending to the recessed portion is mounted on the mounting apparatus, the resilient free ends bias the pivots of the light-reflecting member toward one end of the pivot holes of the mounting apparatus.

7. The panel assembly as described in claim 1, wherein the panel includes a base and a bent plate perpendicular to the base, the light-pervious area defined in the bent plate, the base defining an opening for exposing the rotary member to the outside of the panel.

8. A panel assembly for a computer, comprising:
a computer panel comprising a light-pervious area and an opaque portion surrounding the light-pervious area;
a mounting apparatus mounted to the panel;
a light source for emitting light rays fixedly secured to the mounting apparatus;
a light-reflecting member pivotally mounted to the mounting apparatus and obliquely rotated relative to the light source, the light-reflecting member having a cavity, a toothed engaging member, and a light-pervious portion, the light source being received in the cavity, the light-reflecting member being configured for reflecting the light rays to exit from the light-pervious portion; and
a rotary gear member meshed with the toothed engaging member of the light-reflecting member; the rotary gear member is rotatable such that the light-reflecting member is driven to rotate between a first position where the light-pervious portion is aligned with the light-pervious area and second position where the light-pervious portion faces toward the opaque area.

9. The panel assembly as described in claim 8, wherein a switch element is received in the mounting apparatus, and the rotary gear member is movable toward the switch element so as to actuate the switch element.

10. The panel assembly as described in claim 9, wherein a pair of tabs is formed on the mounting apparatus, a pair of axles protrudes from opposite sides of the rotary member, each tab defines a rotating hole for the corresponding axle rotating therein, and one of the pair of axles abuts on the switch element.

11. The panel assembly as described in claim 8, wherein the mounting apparatus comprises a recessed portion defining an opening for receiving a first side of the light-reflecting member, and the rotary gear member is meshed with the toothed engaging member through the opening.

12. The panel assembly as described in claim 11, wherein the mounting apparatus has a receiving portion for receiving the indicator light therein, the first side of the light-reflecting member being received between the recessed portion and the receiving portion, and the first side of the light-reflecting member defines an accommodating hole corresponding to the receiving portion for receiving the indicator light.

13. The panel assembly as described in claim 11, wherein a pair of pivot holes is defined in opposite sides of the recessed portion of the mounting apparatus; two pivots protrude from opposite ends of the light-reflecting member and are located in the corresponding pivot hole.

14. The panel assembly as described in claim 13, wherein a resilient member having two resilient free ends extending to the recessed portion is mounted on the mounting apparatus, the resilient free ends bias the pivots of the light-reflecting member toward one end of the pivot holes of the mounting apparatus.

15. The panel assembly as described in claim 8, wherein the panel includes a base and a bent plate perpendicular to the base, the light-pervious area is defined in the bent plate, the base defining an opening for exposing the rotary gear member to the outside of the panel.

\* \* \* \* \*